United States Patent [19]

Davies et al.

[11] 4,428,839

[45] Jan. 31, 1984

[54] SEPARATOR FOR OIL, GAS AND WATER

[75] Inventors: Evan E. Davies, Near Newbury; Jiri R. Nebrensky, East Molesey, both of England

[73] Assignee: The British Petroleum Company Limited, London, England

[21] Appl. No.: 175,405

[22] Filed: Aug. 6, 1980

[30] Foreign Application Priority Data

Aug. 9, 1979 [GB] United Kingdom ............... 7927806

[51] Int. Cl.³ ............................................. B01D 21/26
[52] U.S. Cl. .................................... 210/512.3; 55/52; 55/204
[58] Field of Search .................. 55/45, 55, 46, 176, 55/177, 459 R, 52; 210/512, 294, 304, 789, 788, 787, 537, 804, 512.3

[56] References Cited

U.S. PATENT DOCUMENTS

| 815,407 | 3/1906 | Cooper | 55/177 X |
|---|---|---|---|
| 2,387,035 | 10/1945 | Miller | 210/294 |
| 2,681,124 | 6/1954 | Van Der Kolk | 55/459 R X |
| 3,163,508 | 12/1964 | Tuck et al. | 55/46 |
| 3,204,772 | 9/1965 | Ruxton | 210/512 |
| 3,273,318 | 9/1966 | Meyer | 55/176 X |
| 3,499,531 | 3/1970 | Feasel | 210/512.1 X |
| 3,516,551 | 6/1970 | Wallen et al. | 210/512 |
| 3,668,825 | 6/1972 | McIlvaine | 55/21 |
| 3,802,570 | 4/1974 | Dehne | 210/304 |
| 4,017,275 | 4/1977 | Hodgson et al. | 55/177 X |

Primary Examiner—Frank A. Spear, Jr.
Attorney, Agent, or Firm—Morgan, Finnegan, Pine, Foley & Lee

[57] ABSTRACT

A cyclone separator for separating a crude oil feed containing gas and water into (i) gas, (ii) liquid oil and (iii) water comprises a vessel having an inlet disposed so that feed introduced under a pressure gradient is caused to form a downwardly flowing liquid vortex from which gas separates, an upper outlet for the gas, a hollow cylinder or small angle cone whose internal surface provides a surface for the liquid vortex, the walls of the vessel being spaced from the cone to define therebetween a disengaging chamber, an outlet for gas from the disengaging chamber, a first lower outlet for the liquid oil and a second lower outlet for the water.

6 Claims, 3 Drawing Figures

SEPARATOR FOR OIL, GAS AND WATER

BACKGROUND OF THE INVENTION

This invention relates to a separator suitable for separating oil containing gas and water into gas and two liquid streams one being an oil rich stream the other a water rich stream and also to a process of effecting such a separation.

When oil is produced from a well, it is forced from the reservoir by natural pressure up the well to the surface. As the oil rises the pressure becomes less and gas associated with the oil is progressively released from solution.

After emerging from the well, it is necessary to treat the mixture of liquid oil and gas to remove the free gas and dissolved gas which is likely to come out of solution when the oil is maintained at about atmospheric pressure as, for example, during transport in a tanker.

Our UK patent application No. 2000054A, which corresponds to now abandoned U.S. Ser. No. 917,719, describes a cyclone separator capable of separating such a mixture the cyclone having a cone located therein and our co-pending UK patent application No. 2035150A, which corresponds to U.S. Pat. No. 4,369,047 describes a cyclone separator which has been improved by the provision of baffles below the cone. Further, our co-pending European Patent Application No. 80301144.4 which has been published as European 0 018 168 and corresponds to pending U.S. application Ser. No. 318,160, describes a cyclone separator which has been further improved by the cone being in the form of one of small apex angle or as a cylinder.

Water, the amount of which can vary greatly, is usually also produced with the oil and it is desirable to also remove the water since the latter is often saline and may well cause corrosion of steel production facilities. However, with the separators disclosed in the three above mentioned patents water, if present in the feed, is separated within the liquid oil.

SUMMARY OF THE INVENTION

It is therefore an object of the present invention to provide a cyclone separator which is capable of separating water as well as gas from liquid oil.

Thus, according to the present invention, a cyclone separator suitable for separating a crude oil feed containing gas and water into (i) gas, (ii) an oil rich liquid, and (iii) a water rich liquid comprises a vessel having (a) an inlet for feed disposed so that feed introduced under a pressure gradient is caused to form a downwardly flowing vortex of liquid from which gas separates, (b) an upper outlet for the gas comprising a pipe extending downwardly into the vessel, herein referred to as a vortex finder, (c) a downwardly extending hollow truncated cone whose apex angle is less than 20° located below the inlet and disposed so that its internal surface provides a surface for the downwardly flowing vortex of liquid, the walls of the vessel being spaced apart from the truncated cone to define therebetween a disengaging chamber, the vessel being sized so as to allow the downwardly flowing liquid to separate into an oil rich liquid layer and a water rich liquid layer, (d) a first lower outlet for the oil rich liquid and located so as to withdraw the oil rich liquid from below the lower end of the cone, and (e) a second lower outlet located below the first lower outlet for the water rich liquid.

Desirably there is located in the region of the lower end of the truncated cone one or more baffles to engage the vortex of liquid and thereby act as a vortex arresting baffle.

A convenient arrangement is for the baffle to be in the form of a plate and disposed transversely with respect to the cone and conveniently below the lower end thereof, to provide a gap between the plate and the lower end of the cone. Conveniently the size of the gap is adjustable and the plate is disposed symmetrically with respect to the longitudinal axis of the cone.

By the term hollow truncated cone of apex angle less that 20° in the present specification we also mean to include a cylinder. The latter can conveniently be regarded as a truncated cone whose apex angle is zero when viewed in a vertical section. Preferably the diameter of the cone at its lower end is conveniently at least 0.80 that of the upper end.

Desirably there is located below the first lower outlet a deflector, suitably in the form of a flat plate, corrugated surface or hollow truncated cone to assist in keeping the oil and water phases separate and/or reduce mixing. Conveniently the deflector is shaped to assist in deflecting downwardly flowing liquid towards the walls of the vessel.

Conveniently a level sensor is provided for sensing the oil level in the vessel and control means are provided for controlling the flow from the first lower outlet and/or second lower outlet in response to said oil level.

Conveniently a further level sensor is provided for sensing the water level and control means are provided for controlling the flow from the first lower outlet and/or second lower outlet in response to said water level.

The ratio of the diameter of the upper outlet pipe to that of the vessel in the region of the inlet can be from 0.40 to 0.80, conveniently from 0.55 to 0.75. The upper outlet pipe can extend into the vessel below the centre line of the inlet and can conveniently terminate at a level intermediate the centre line of the inlet and the upper end of the cone.

The upper outlet pipe can have in the region of the lower end thereof a flared portion herein referred to as a skirt, to reduce the amount of liquid entrained in the gas flowing upwardly in the vortex finder.

References in the present specification to lower, upper and vertical refer to the separator in its disposition for normal use.

Conveniently the first lower outlet for the oil rich liquid is in the form of a pipe extending into the vessel through the wall thereof to withdraw liquid from a region below the lower end of the cone and conveniently near the axis of the vessel.

The second lower outlet can also be in the form of a pipe extending through the wall of the vessel and can be disposed to withdraw liquid from a region near the base of the vessel. The outlet can be provided by an aperture in the region of the base of the vessel.

In operation the flow through the outlets is preferably controlled to maintain a steady oil level and a steady water level in the disengaging chamber.

The inlet to the vessel is preferably rectangular in cross section to assist tangential entry.

Since the feedrate may vary it is desirable to have means for controllably adjusting the size of the inlet comprising an adjustable shutter to restrict the inlet, for example, as described in our UK patent application No. 2000054A and our co-pending UK patent application No. 2035150A.

If necessary provision may be made for injecting a demulsifier or defoaming agent, e.g. a silicone oil, at any convenient point.

The disengaging chamber may be provided by an enlarged lower portion of the vessel.

In the case of a vessel whose horizontal section is circular the diameter of the enlarged portion may be conveniently 1.2 to 2.0 that of the upper portion.

In the present specification the volume the vessel below where conical surface terminates is considered to be part of the disengaging chamber.

The feed may also contain solids which are normally present in crude oil in the amounts in which they are normally present. Such solids are separated with the water rich liquid stream.

The present invention also provides a process for separating a crude oil containing water and gas into
(i) gas,
(ii) an oil rich liquid,
(iii) a water rich liquid,
which process comprises passing the feed into a cyclone separator, forming a downwardly flowing vortex of liquid from which gas separates, withdrawing the separated gas and wherein the descending liquid is caused to form an oil rich liquid layer and a water rich liquid layer and withdrawing the two liquid layers separately.

The feed may have a gas:liquid ratio of from 1.5:1 to 15:1 and may optionally contain water in amount up to 50% or more (both amounts being by volume referred to the feed at separation conditions) and the pressure inside the vessel can be from 1 to 120 bar absolute and inlet velocities to the vessel can be from 5 to 250 m/sec and the process can involve controlling the operating conditions within the ranges specified to obtain a separated gas not more than 10 ppm vol of liquid and a separated oil rich liquid containing more than 2% water and a water rich liquid containing not more than 5% oil (both % being by vol).

In many cases it is preferred to control the inlet velocity to the vessel in the range 8 to 70 m/sec to improve vortex formation.

Desirably the oil level in the vessel is controlled to be as high as possible consistent with there being no measurable carry over of oil in the gas. When there is oil carry over, the oil content of the gas which is normally below 1 ppm (part per million) rises rapidly. Similarly, if the oil level is too low then there may be gas in the liquid oil and the gas content of the oil, normally below 15% by volume, will rise.

Preferably the separator vessel includes means for controlling the oil level within the above mentioned limits.

Preferably the separator vessel also includes means for controlling the water level so that the water content of the oil does not exceed 2% vol and the oil content of the water does not exceed 5% vol.

BRIEF DESCRIPTION OF THE DRAWINGS

The invention is illustrated by reference to the accompanying drawings in which.

DESCRIPTION OF THE PREFERRED EMBODIMENT

Figure 1:
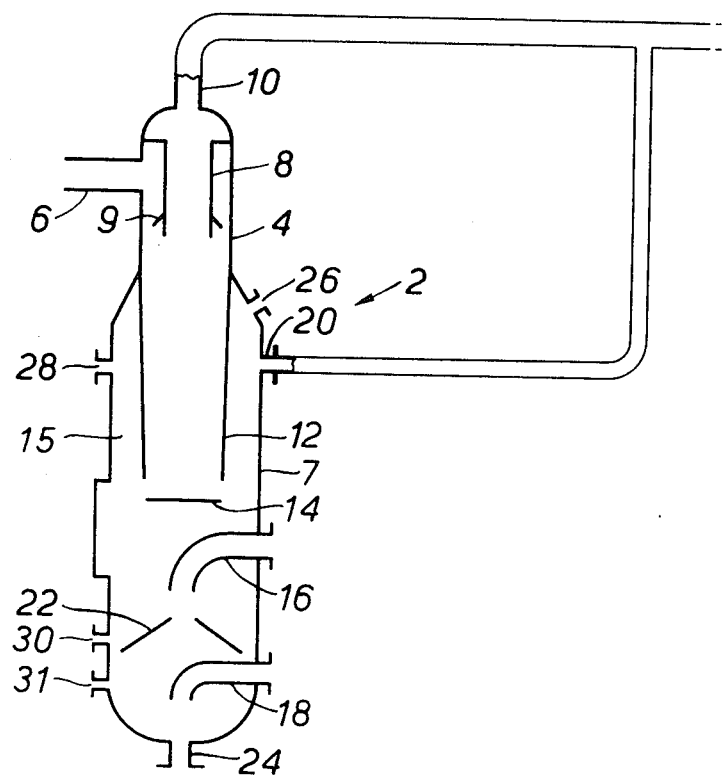
FIG. 1 is a vertical section of one embodiment of cyclone separator.

Referring to FIG. 1 the separator indicated generally by reference numeral 2 comprises a vessel 4 having an inlet 6 of rectangular cross section disposed tangentially with respect to the vessel 4 to cause incoming feed to form a downwardly spinning vortex of enhanced liquid from which an upwardly spinning vortex of enhanced gas separates. The inlet is controllably variable as described in our co-pending UK patent applications Nos. 2000054A and 2035150A to provide a turndown capacity and to accommodate changes in feed composition. The separator has an outlet for gas herein referred to as a vortex finder 8 leading to an outlet pipe 10, and a hollow truncated cone 12 of small angle (the angle at the apex of the cone is 3°) to provide a surface for the downwardly spinning vortex. The ratio of the diameter of the cone at its lower end to that at its upper end is 0.88. A disengaging chamber 15 is provided by the space between cone 12 and the walls 7 of the lower part of the vessel and an outlet 20 for withdrawing gas from the disengaging chamber 15 is provided so that gas not separated from the liquid in the centrifugal action in the cone does not interfere with the liquid level control.

The disengaging chamber 15 is also provided with a pressure relief valve 26.

Located transversely with respect to the axis of the cone 12 and a small distance below the lower end thereof is a baffle in the form of a circular plate 14, the purpose of which is to arrest the vortex of gas. Means are provided, (not shown), for moving the plate up or down to adjust the size of the gap between the lower end of the cone and the plate to optimise the performance of the separator. Below the plate 14 is a first lower outlet 16 for the liquid oil, arranged so that liquid is withdrawn from below the axis of the outlet to reduce the risk of entrainment of gas in the oil during discharge. Below outlet 16 is a partition 22 in the form of a hollow truncated cone, the axis of the cone lying on the axis of the vessel. The cone is disposed so as to allow water to flow on its upper surface downwardly and outwardly towards the walls of the vessel and into the portion of the vessel below the partition. Below the partition 22 is a second lower outlet 18 for the water rich liquid stream disposed in a manner similar to outlet 16.

A set of straightening vanes, (not shown), are included in the outlet pipe 10 to eliminate any spinning of the gas.

The vortex finder 8 has a flared portion to provide a skirt 9 to reduce the tendency of droplets of liquid on the exterior to be entrained in the gas flowing upwardly into the vortex finder.

The vessel has two connections only one of which 28 is shown for an oil level controller, (not shown), and connections 30 and 31 for a water level controller, (also not shown). At the bottom of the vessel is a drain hole 24.

Figure 2:
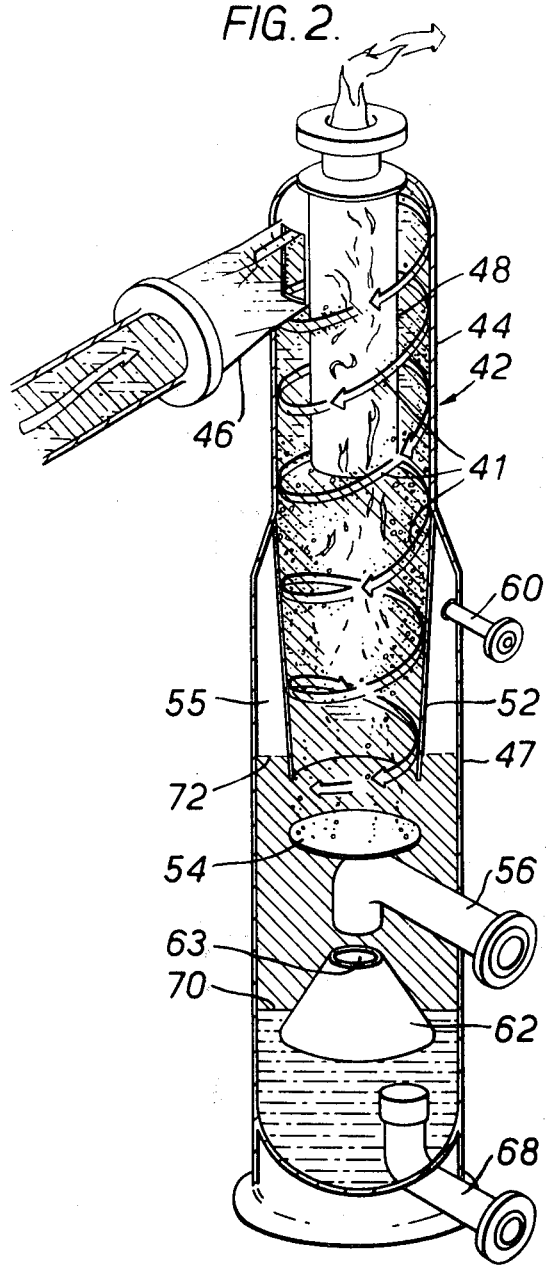
FIG. 2 is an elevation partly cut away of an alternative embodiment of cyclone separator.

Referring to FIG. 2 the separator indicated generally by reference numeral 42 comprises a vessel 44 having an inlet 46 of rectangular cross section disposed tangentially with respect to the vessel 44 to cause incoming feed to form a downwardly spinning vortex 41 from which gas separates. The inlet 46 is controllably variable as described in our co-pending UK patent application Nos. 2000054A and 2035150A to provide a turndown capacity. The separator has a vortex finder 48 leading to an outlet pipe, (not shown), and a hollow inverted truncated cone of small angle 52 (the angle at the apex of the cone is 3°) to provide a surface for the downwardly spinning vortex 41. The ratio of the diameter of the cone 52 at its lower end to that at its upper end is 0.88.

A set of straightening vanes, (not shown), are included in the outlet pipe, (not shown), to eliminate any spinning of the gas.

A disengaging chamber 55 is provided by the space between cone 52 and the walls 47 of the lower part of the vessel and an outlet 60 for withdrawing gas from the disengaging chamber 55 is provided so that gas not separated from the liquid in the centrifugal action in the cone 52 does not interfere with the liquid level control.

The disengaging chamber 55 is also provided with a pressure relief valve, (not shown).

Located transversely with respect to the axis of the cone 52 and a small distance below the lower end thereof is a baffle 54 in the form of a circular plate 54, the purpose of which is to arrest the vortex 41. Means are provided, (not shown), for moving the plate 54 up or down to adjust the size of the gap between the lower end of the cone 52 and the plate 54 to optimise the performance of the separator. Below the plate 54 is a first lower outlet 56 for the liquid oil, arranged so that liquid is withdrawn from below the axis of the outlet to reduce the risk of entrainment of gas in the oil during discharge. Below outlet 56 is a deflector 62 in the form of a hollow truncated cone, the cone being co-axial with the vessel 44. The cone 62 is disposed so as to allow water to flow on its upper surface downwardly and outwardly towards the walls 47 of the vessel and away from the oil outlet into the portion of the vessel below the deflector. Below the deflector 62 is a second lower outlet 68 for the water rich liquid stream. Droplets of oil can flow upwards within the deflector into the oil phase above interface 70 through the aperture at the top of the cone 62.

The vortex finder 48 has a flared portion (not shown) to provide a skirt to reduce the tendency of droplets of liquid on the exterior to be entrained in the gas flowing upwardly into the vortex finder 48. An oil/gas interface at 72 is normally maintained above the lower end of cone 52.

Figure 3:
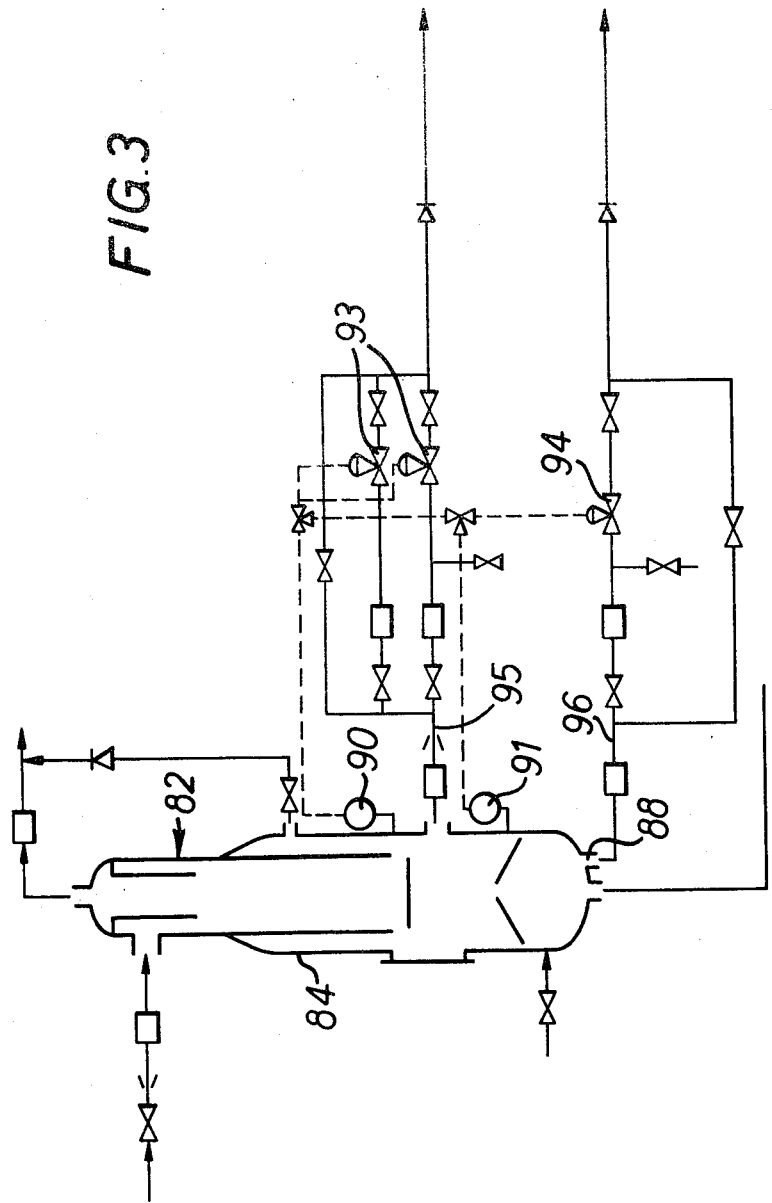
FIG. 3 is a vertical section of an alternative embodiment of cyclone separator (in which the water outlet is in a different position) and also showing schematically the oil and water level controls. Although not shown in the drawings the embodiments include the adjustable shutter to restrict the inlet as described in our UK patent applications Nos. 2000054A and 2035150A.

Referring to FIG. 3 the separator indicated generally by sumeral 82 comprises a vessel 84 of similar construction to that shown in FIG. 1 except the outlet 88 for the water is located nearer the base of the vessel 84. The vessel 84 has an oil level sensor 90 and a water level sensor 91 and control means comprising valves 93 and 94 controlling the flow in lines 95 and 96, the valves 93 and 94 being operated in response to signals indicative of the oil and water levels.

EXAMPLE 1

Use of a Single Cyclone

The cyclone separator was a single vessel as illustrated in FIG. 1, and was operated with the oil/gas and oil/water interfaces as shown in FIG. 2.

The operating conditions and performance data are summarised in the following table.

| Feed | | |
|---|---|---|
| Total rate* | m$^3$/hr | 650 (equivalent to 12,000 bbl/day of liquid + gas) |
| Oil flow | m$^3$ oil/hr | 66.2 |
| | (bbl/day) | 10,000 |
| Temperature | °C. | 40 |
| Inlet pressure | bar abs | 42.4 |
| Equilibrium gas content | vol % | 87.8 |
| Gas/oil ratio* | vol/vol | 7.2 |
| Water content in the liquid | % by vol | 16.6 |
| Products | | |
| Liquid from 1st lower outlet | | |
| Total rate | m$^3$/hr | 76.7 |
| Water content | vol % | 2.0 |
| Oil content | vol % | 84.0 |
| The liquid contained 12.0% volume of gas. | | |
| Liquid from 2nd lower outlet | | |
| Total rate | m$^3$/hr | 12.5 |
| Oil content | vol % | 1.9 |
| Water content | vol % | 93.1 |
| The liquid contained 5% volume of gas. | | |
| Gas from vortex finder | | |
| Total rate at outlet | m$^3$/hr | 595 |
| Pressure | bar | 40 bar absolute |
| Liquid (oil & water) content | ppm | 1 |

*assumes equilibrium state

This Example illustrates that a separator according to the invention can separate a mixture of liquid oil with 7.2 times its own volume of gas and 16.6% its own volume of water into (i) a liquid oil containing 2% by volume of water and 12.0% by volume of gas, (ii) water containing 1.9% by volume of oil and (iii) gas containing less than 1 ppm of liquid.

EXAMPLE 2

The cyclone was a single vessel as illustrated in FIG. 1 but of smaller size than that employed in Example 1.

| Feed - liters/hour | | |
|---|---|---|
| Gas | 93.3 | Temperature 21° C. |
| Liquid oil | 19.2 | Inlet pressure 1.7 bar absolute |
| Water | 4.2 | |
| Total | 116.7 | |
| Vortex finder pressure | 1.5 bar absolute | |
| Products - liters/hour | | |
| From 1st lower outlet | | |
| Oil | 19.2 containing 21.2 liters/hr of gas and 0.35 liters/hr of water | |
| From 2nd lower outlet | | |
| Water | 3.83 | |
| Oil | 71 × 10$^{-6}$ ($\approx$18 ppm of oil) | |
| No gas | | |
| From vortex finder | | |
| Gas | 72.1 containing less than 1 ppm of liquid. | |

The separator according to the present invention is particularly suitable for use as a well test separator where the mixture to be separated may frequently contain water from drilling mud left in the well.

Unless the context clearly requires otherwise, references to volumes of gas and gas to liquid ratios are referred to standard conditions of temperature and pressure i.e. 14.7 psig (1.013 bar absolute) and 60° F. equivalent to 15.6° C.

We claim:

1. A cyclone separator suitable for separating a crude oil feed containing gas and water into (i) gas, (ii) an oil rich liquid and (iii) a water rich liquid, said cyclone separator comprising a vessel having:

(a) an inlet for the crude oil feed disposed so that the feed introduced under a pressure gradient is caused to form a downwardly flowing vortex of liquid from which the gas separates, said inlet being controllably variable to provide a turndown capability (b) an upper outlet for the gas comprising a pipe extending downwardly into the vessel from the top thereof to a level below the inlet, the diameter of the outlet pipe being from 0.4 to 0.8 that of the vessel in the region of the inlet, (c) a downwardly extending hollow truncated cone whose apex angle is less than 20°, located below the inlet and disposed so that its internal surface provides a surface for the downwardly flowing vortex of liquid, the vessel having an enlarged lower portion, the walls of the vessel being spaced apart from the truncated cone to define therebetween a disengaging chamber, (d) an outlet for the discharge of gas from the disengaging chamber, (e) a baffle disposed transversely with respect to the truncated cone and located between the lower end thereof and sized so as to provide a gap between its edges and the walls of the vessel, the vessel being sized so as to allow the downwardly flowing liquid to separate into an oil rich liquid layer and a water rich liquid layer, (f) a first lower outlet for the oil rich liquid and located so as to withdraw liquid from below the lower end of the cone, (g) a second lower outlet for the water rich liquid layer and located below the first lower outlet to withdraw liquid from near the base of the vessel, and (h) a deflector located within the vessel at above and below the oil-water interface as to promote the upward movement of the oil and downward movement of the water.

2. A cyclone separator as claimed in claim 1 wherein the deflector is shaped to deflect downwardly flowing liquid towards the walls of the vessel.

3. A cyclone separator as claimed in claim 1 wherein the upper outlet pipe for the gas is provided with an enlarged portion to reduce liquid extrainment in the gas.

4. A cyclone separator as claimed in claim 1 wherein a level sensor is provided for sensing the oil level in the vessel and control means are provided for controlling the flow from the first lower outlet and/or second lower outlet in response to said oil level.

5. A separator according to claim 1 wherein the inlet is of rectangular cross-section.

6. A process for separating a crude oil feed containing water and gas into (i) gas, (ii) an oil rich liquid, and (iii) a water rich liquid, which process comprises passing the feed into a cyclone separator of claim 1, forming a downwardly flowing vortex of liquid from which gas separates, whereby a gas/oil interface is formed in the separator and the level of the gas/oil interface is maintained above the lower end of the hollow truncated cone, withdrawing the separated gas and wherein the descending liquid is caused to form an oil rich liquid layer and a water rich liquid layer wherein an interface is formed between the oil rich liquid layer and the water rich liquid layer and the level of the interface is maintained between the first and second lower outlets by promoting the upward movement of oil and downward movement of water and withdrawing the oil rich layer and water rich layer separately.

* * * * *